(12) United States Patent
Yamazaki et al.

(10) Patent No.: US 8,744,034 B2
(45) Date of Patent: Jun. 3, 2014

(54) BOILING WATER REACTOR

(75) Inventors: Hiroshi Yamazaki, Kanagawa (JP); Mikihide Nakamaru, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 764 days.

(21) Appl. No.: 12/748,979

(22) Filed: Mar. 29, 2010

(65) Prior Publication Data

US 2010/0290576 A1    Nov. 18, 2010

(30) Foreign Application Priority Data

Mar. 30, 2009   (JP) .................................. 2009-82103

(51) Int. Cl.
*G21C 9/00* (2006.01)

(52) U.S. Cl.
USPC .......................................................... 376/299

(58) Field of Classification Search
USPC .......................................................... 376/283
See application file for complete search history.

(56) References Cited

U.S. PATENT DOCUMENTS

| | | | | |
|---|---|---|---|---|
| 4,093,513 A | * | 6/1978 | Berens et al. | 376/282 |
| 4,808,369 A | * | 2/1989 | Yamanari et al. | 376/282 |
| 5,278,876 A | * | 1/1994 | Sawabe | 376/205 |
| 6,618,461 B2 | * | 9/2003 | Cheung et al. | 376/283 |
| 2003/0048865 A1 | * | 3/2003 | Cheung et al. | 376/283 |
| 2005/0265511 A1 | * | 12/2005 | Tobimatsu et al. | 376/283 |
| 2007/0092053 A1 | * | 4/2007 | Sato | 376/283 |

FOREIGN PATENT DOCUMENTS

| | | | |
|---|---|---|---|
| EP | 0 585 499 A1 | | 3/1994 |
| EP | 0585499 A1 | * | 3/1994 |
| JP | 53-122090 | * | 10/1978 |
| JP | 53-122090 A | | 10/1978 |
| JP | 58-061498 | * | 4/1983 |
| JP | 58-061498 A | | 4/1983 |
| JP | 58-131590 | * | 8/1983 |
| JP | 58-131590 A | | 8/1983 |
| JP | 61-108999 U | | 7/1986 |
| JP | 04-032798 | * | 2/1992 |
| JP | 04-032798 A | | 2/1992 |
| JP | 11-231088 | * | 8/1999 |
| JP | 11-231088 A | | 8/1999 |

* cited by examiner

*Primary Examiner* — Jack W Keith
*Assistant Examiner* — Sean P Burke
(74) *Attorney, Agent, or Firm* — Foley & Lardner LLP

(57) ABSTRACT

A boiling water reactor has a reactor pressure vessel and a through piping. The reactor pressure vessel includes a main body trunk and an openable upper lid covering an upper open end of the main body trunk from above. The through piping penetrates lateral side of the main body trunk and has an opening section at a same level with or higher than the upper open end of the main body trunk in the reactor pressure vessel. The through piping may be connected to the sump arranged outside the reactor pressure vessel in the dry well. The through piping may be further connected to the suppression pool in the wet well and/or to the water level gauge in the dry well.

7 Claims, 5 Drawing Sheets

BOILING WATER REACTOR

CROSS REFERENCE TO RELATED APPLICATION

This application is based upon and claims the benefits of priority from the prior Japanese Patent Application No. 2009-082103, filed in the Japanese Patent Office on Mar. 30, 2009.

BACKGROUND OF THE INVENTION

1. Technical Field

The present invention relates to a boiling water reactor having a reactor pressure vessel equipped with an openable upper lid.

2. Background Art

A typically known boiling water reactor will be described below by referring to FIG. 5. FIG. 5 is a schematic diagram of a known boiling water reactor, showing a cross-sectional elevation of a principal part of the reactor pressure vessel and the system configuration of the vent line and the head spray line thereof.

The vent line 21 of the reactor pressure vessel 1 of a conventional nuclear power plant is installed to exhaust gas and steam from or supply gas and steam to the inside of the reactor pressure vessel 1 when the nuclear reactor is shut down, and penetrates a reactor pressure vessel upper lid 2. The vent line 21 arranged at a top part of the reactor pressure vessel 1 includes a non-condensable gas exhaust line 23 arranged to exhaust non-condensable gas that can be accumulated in the top part of the reactor pressure vessel 1 while the nuclear reactor is operating. An end of the vent pipe is connected to a main steam pipe 20.

A head spray line 22 is branched from the vent line 21 as disclosed in Japanese Patent Application Laid-Open Publication No. 11-231088, the entire content of which is incorporated herein by reference. When the nuclear reactor is shut down, the steam discharged from a dryer 26 can be cooled by spraying water into the gas phase section in the reactor pressure vessel upper lid 2 by way of the head spray line 22.

Additionally, the water level in the inside of the reactor pressure vessel 1 needs to be raised and lowered when the nuclear reactor is started and shut down, and a reactor water level gauge 7 is provided to monitor the water level. An upper take-out point of the reactor water level gauge 7 is branched out from the top part of the reactor pressure vessel 1.

The fuel in the reactor core 34 in the reactor pressure vessel 1 keeps on emitting decay heat after the nuclear reactor is shut down. In order to remove the decay heat, the reactor water in the reactor pressure vessel 1 is partly taken out, pressurized by a reactor water circulation pump 16 and cooled by way of a reactor water cooling heat exchanger 17. Then, the cooled water is returned to the inside of the reactor pressure vessel 1.

Besides, water can be fed to the head spray line 22 from the downstream of the reactor water cooling heat exchanger 17. More specifically, steam can be cooled in the reactor pressure vessel 1 by partly utilizing the water to be returned to the reactor pressure vessel 1 so as to spray the water into the gas phase section in the reactor pressure vessel upper lid 2.

The piping of the reactor pressure vessel vent line 21 and the head spray line 22 is disposed on the heat insulating material 15 of the reactor pressure vessel 1. Therefore, the heat insulating material 15 cannot be removed unless the reactor pressure vessel flanges 24 are uncoupled and the piping on the reactor pressure vessel upper lid 2 is taken away.

It is required to reduce the shut down period of the nuclear reactor of a nuclear power plant in order to improve the operation rate of the power plant. In recent years, the head spray line has been employed to cool the upper part of the nuclear reactor in order to improve the cooling rate of the nuclear reactor and to open the reactor pressure vessel as soon as possible.

When the nuclear reactor is shut down and the temperature of the reactor water is 100 degrees Celsius or higher, the piping connected to the reactor pressure vessel 1 cannot be removed because the inside of the reactor pressure vessel upper lid 2 is filled with steam. The heat insulating material 15 of the reactor pressure vessel 1 cannot be removed in such a condition.

Therefore, in order to open the reactor pressure vessel 1 early, it is desirable to remove the reactor pressure vessel heat insulating material 15 early and, when the reactor water temperature falls well below 100 degrees Celsius, quickly take away the reactor pressure vessel upper lid 2.

To take away the reactor pressure vessel upper lid 2, the operation of loosening the stud bolts 11 tightly binding the reactor pressure vessel flanges 5 together needs to be conducted quickly. However, since the head spray line 22 is not so designed as to directly spray water to the inner wall of the reactor pressure vessel 1, it takes time to cool the reactor pressure vessel 1 even by using the head spray line 22.

SUMMARY OF THE INVENTION

In view of the above-identified circumstances, it is therefore an object of the present invention to make it possible to open the reactor pressure vessel upper lid of a boiling water reactor early when the reactor is shut down.

According to the present invention, there is provided a boiling water reactor comprising: a reactor pressure vessel that includes a main body trunk having an upper open end and an openable upper lid covering the upper open end of the main body trunk from above; and a through piping that penetrates lateral side of the main body trunk and has an opening section at a same level with or higher than the upper open end of the main body trunk in the reactor pressure vessel.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Figure 3:
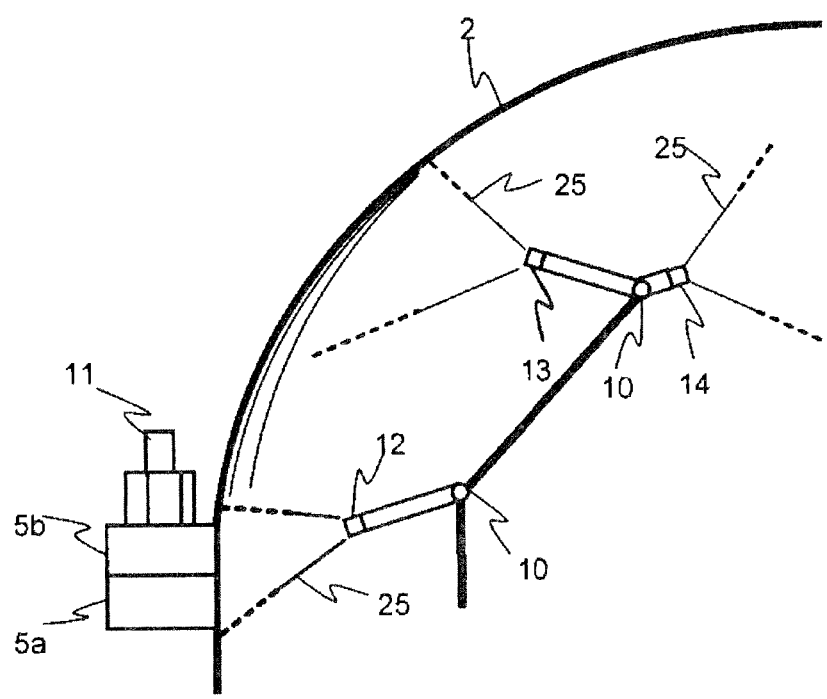
FIG. 3 is a schematic partial cross-sectional elevational view of the head spray line of FIG. 2, showing the configuration thereof.
Figure 4:
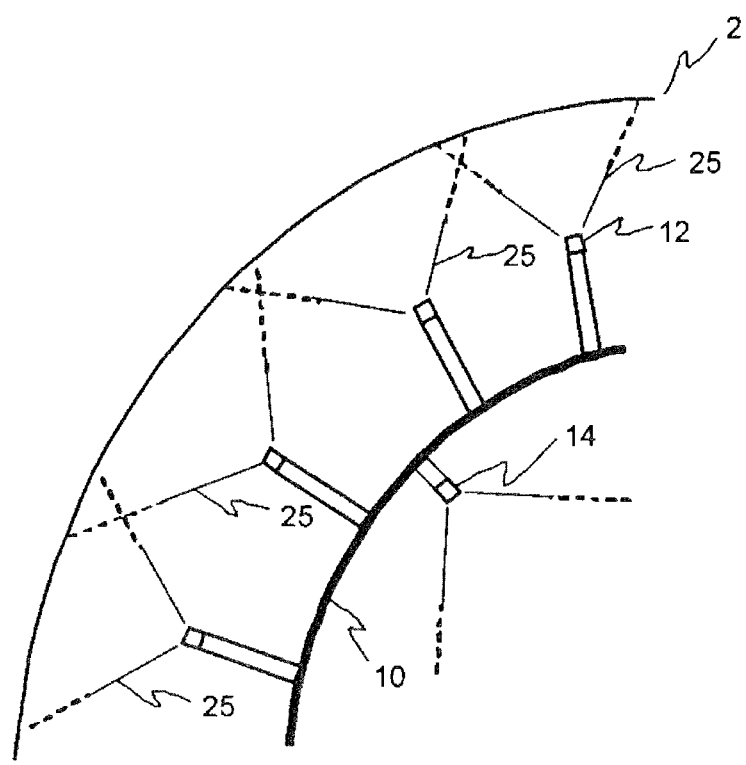
FIG. 4 is a schematic partial cross-sectional plane view of the head spray line of FIGS. 2 and 3 showing the configuration thereof.
Figure 5:
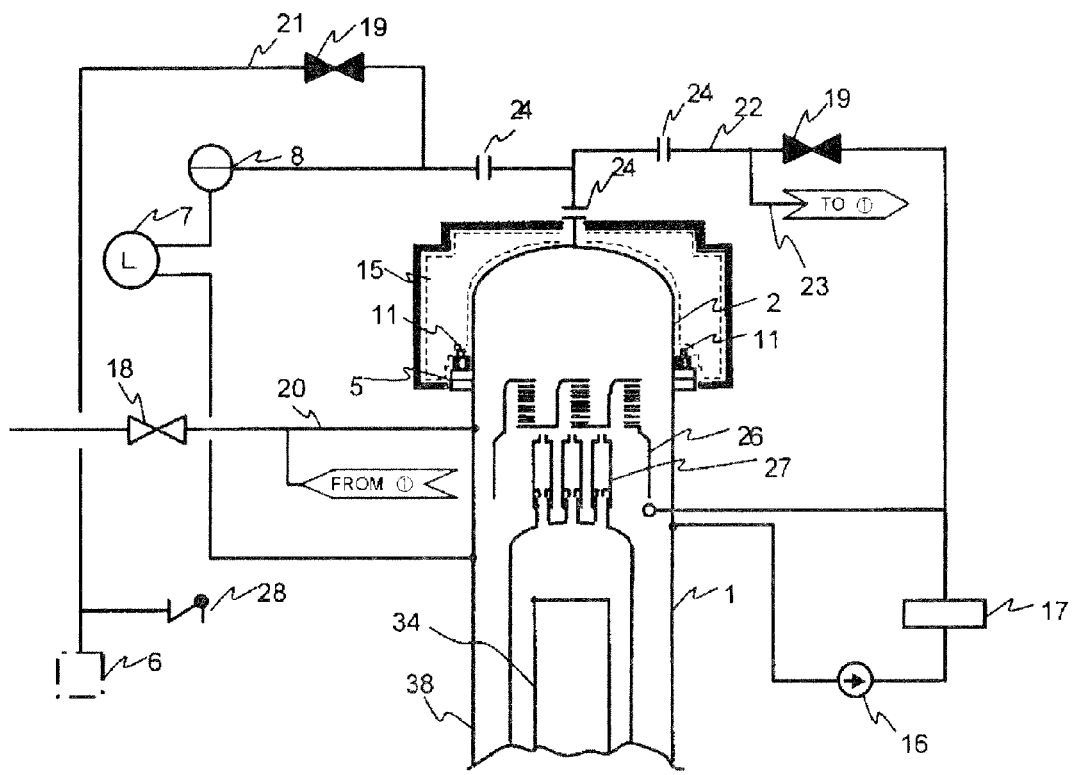
FIG. 5 is a schematic diagram of a known boiling water reactor, showing a cross-sectional elevation of a principal part of the reactor pressure vessel and the system configuration of the vent line and the head spray line thereof.

Now, embodiments of the boiling water reactor according to the present invention will be described below by referring to FIGS. 1 through 4. The components same as or similar to those of the conventional art shown in FIG. 5 are denoted by the same reference symbols and will be not described repeatedly.

First Embodiment

Figure 1:
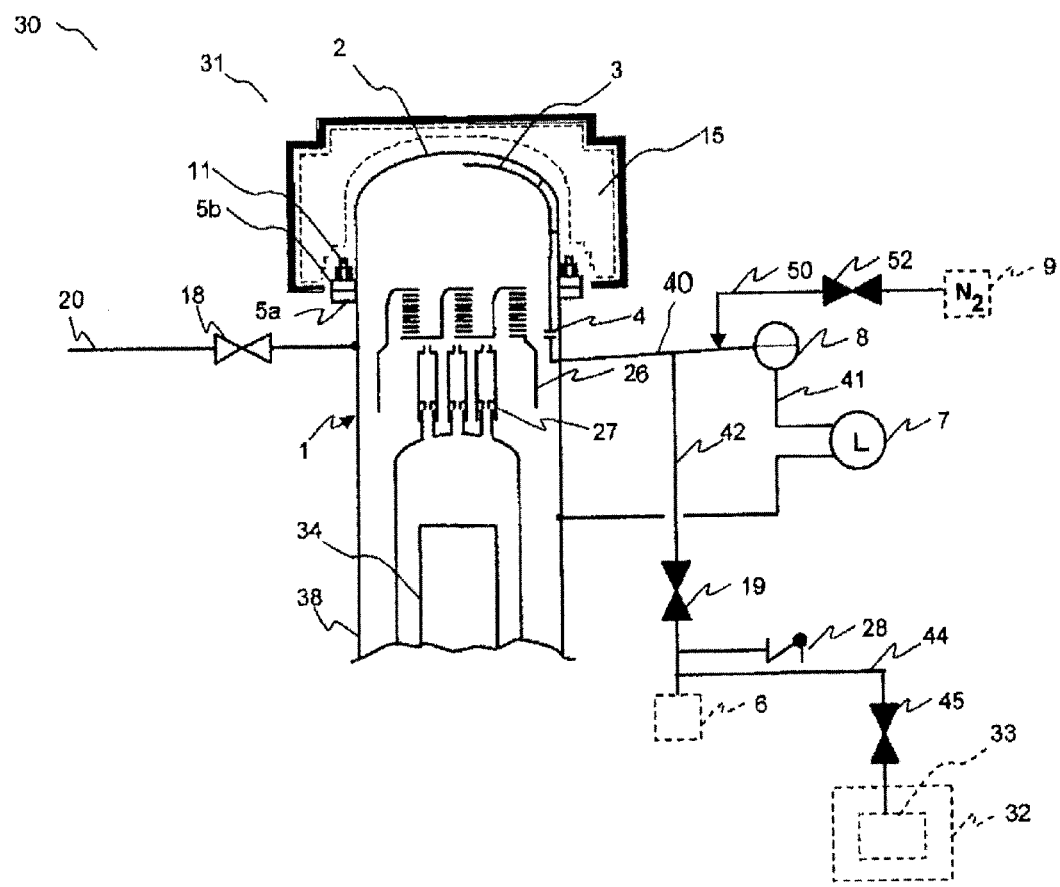
FIG. 1 is a schematic diagram of the first embodiment of boiling water reactor according to the present invention, showing a cross-sectional elevation of a principal part of the reactor pressure vessel and the system configuration of the vent line thereof.

The vent line in the inside of the reactor pressure vessel of this embodiment will be described below. FIG. 1 is a schematic diagram of the first embodiment of the boiling water reactor according to the present invention, showing a cross-sectional elevation of a principal part of the reactor pressure vessel and the system configuration of the vent line thereof.

A containment vessel 30 is partitioned to form a dry well 31 and a wet well 32 that communicate with each other. A reactor pressure vessel 1 is disposed in the dry well 31. A suppression pool 33 is disposed in the wet well 32.

The reactor pressure vessel 1 is a substantially cylindrical container with a vertical axis, and has a main body trunk 38 with an upper open end formed at the top thereof and a pressure vessel upper lid 2 arranged to cover the upper open end. The junction of the main body trunk 38 and the pressure vessel upper lid 2 has a flange structure such that the main body trunk flange 5a formed at the upper end of the main body trunk 38 and the upper lid flange 5b formed at the lower end of the pressure vessel upper lid 2 are coupled together by means of a plurality of stud bolts 11. The pressure vessel upper lid 2 is covered at the outside thereof with a heat insulating material 15. Although not shown, the main body trunk 38 is also covered by a heat insulating material at the periphery thereof.

A reactor core 34, separators 27 and dryers 26 are arranged in the reactor pressure vessel 1. At least the reactor core 34 and the separators 27 are disposed below the main body flange 5a.

A main steam pipe 20 is connected to the main body trunk 38 and a valve 18 (normally open) is arranged at an intermediate position thereof.

A reactor pressure vessel vent line 3 penetrates the main body trunk 38. The reactor pressure vessel vent line 3 extends upward along the inner wall surface of the reactor pressure vessel upper lid 2 in the reactor pressure vessel 1.

The reactor pressure vessel vent line 3 is connected to a condensation tank 8 for the reactor water level gauge by gas phase piping 40 extending substantially horizontally outside the reactor pressure vessel 1. Water piping 41 extending downward from the condensation tank 8 passes through the reactor water level gauge 7 and is connected to the reactor pressure vessel 1 below the gauge 7. Piping 42 branched from the gas phase piping 40 is connected to a dry well sump 6 through a drain valve 19 (normally closed). Piping 43 branched from the piping 42 at the downstream side (lower side) of the drain valve 19 is connected to a vacuum breaker 28. Piping 44 branched from the piping 42 at the downstream side of the drain valve 19 is connected to the suppression pool 33 by way of a valve 45 (normally closed).

A nitrogen gas filling line 50 is branched from the gas phase piping 40 at an intermediate position thereof so that nitrogen gas can be supplied from a nitrogen gas cylinder 9 to the gas phase piping 40 by way of a nitrogen gas supply valve 52.

With the above described arrangement of the reactor pressure vessel vent line 3, the reactor pressure vessel vent line 3 can be used to raise the water level in the reactor pressure vessel 1 at the time of a pressure resistance test or an operation of filling the nuclear reactor with water without penetrating the reactor pressure vessel upper lid 2.

Additionally, since the reactor pressure vessel upper lid 2 is free from any penetrations, the heat insulating material 15 of the reactor pressure vessel upper lid 2 and the reactor pressure vessel vent line 3 do not interfere with each other. Therefore, the heat insulating material 15 of the reactor pressure vessel upper lid 2 can be taken off to open the reactor pressure vessel 1 early while the nuclear reactor is under depressurization after it is shut down. The vent line is installed in the reactor pressure vessel upper lid 2 and is connected to the piping 40 that penetrates the main body trunk 38 below the main body trunk flange 5a at flanges 4. If the water level of the nuclear reactor is raised only to the vicinity of the level of the main body trunk flange 5a, it can be so arranged that the opening of the vent line is positioned at or above the level of the main body trunk flange 5a and no vent is formed at the reactor pressure vessel upper lid 2.

Steam can be prevented from dispersing from the inside of the dry well 31 when the vent of the reactor pressure vessel is opened, by connecting the discharge line to the dry well sump 6 at the time of venting the reactor pressure vessel 1.

Alternatively, the steam from the reactor pressure vessel vent line 3 can be discharged into the suppression pool 33 that is operated as heat sink in case of accident, instead of discharging the steam into the dry well sump 6

The reactor water level gauge 7 is arranged to monitor the water level when the reactor water level is raised or lowered during start up or shut down operation of the nuclear reactor. Because of this arrangement, the vent line 3 can be connected to the condensation tank 8 disposed at the reactor water level gauge 7, utilizing the vent line 3 as upper taking out point for gauging the water level by the reactor water level gauge 7. The reference water level can be held to a constant value by opening the drain valve 19.

When the nuclear reactor is shut down and the reactor water level is raised, nitrogen gas can be fed into the reactor pressure vessel vent line 3 by way of the nitrogen gas filling line 44 and fill the vent line 3 with nitrogen gas in order to replace steam with nitrogen gas so as to raise the water level stably. By filling with nitrogen gas, the non-condensable gas accumulated in a top part of the reactor pressure vessel 1 can be diluted and replaced when the nuclear reactor is shut down.

Second Embodiment

Figure 2:
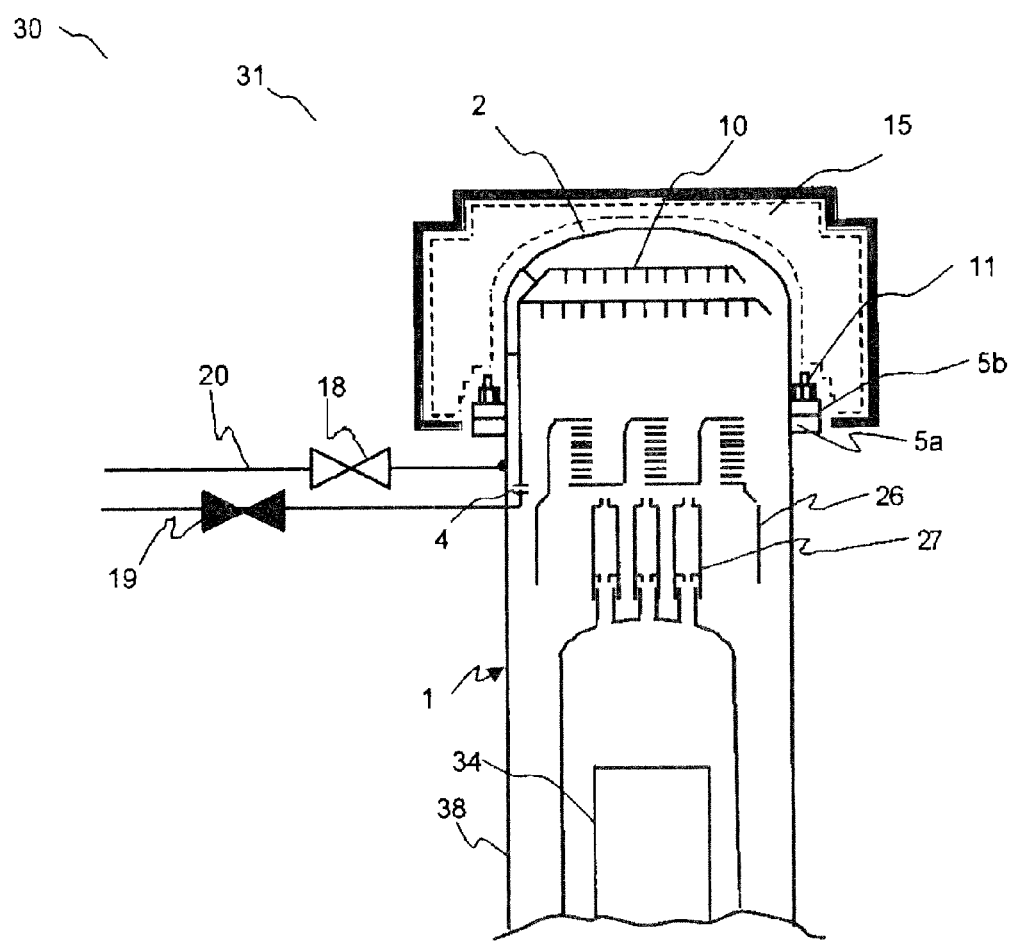
FIG. 2 is a schematic diagram of the second embodiment of boiling water reactor according to the present invention, showing a cross-sectional elevation of a principal part of the reactor pressure vessel and the system configuration of the head spray line thereof.

FIG. 2 is a schematic diagram of the second embodiment of boiling water reactor according to the present invention, showing a cross-sectional elevation of a principal part of the reactor pressure vessel and the system configuration of the head spray line thereof. FIG. 3 is a schematic partial cross-sectional elevational view of the head spray line of FIG. 2, showing the configuration thereof. FIG. 4 is a schematic partial cross-sectional plane view of the head spray line of FIGS. 2 and 3, showing the configuration thereof.

The head spray line in the inside of the reactor pressure vessel of this embodiment will be described below.

The reactor pressure vessel head spray line 10 penetrates the lateral side of the main body trunk 38 and not the reactor pressure vessel upper lid 2.

Additionally, spray nozzles 12 may be arranged so as to directly spray water toward the inner surface of the main body trunk flange 5a and that of the upper lid flange 5b from the head spray line 10 in order to improve the rate of cooling the nuclear reactor when the nuclear reactor is shut down. The head spray line 10 is installed in the reactor pressure vessel upper lid 2 and connected to the piping penetrating the main body trunk 38 at the flanges 4. The spray nozzles 12 are directed obliquely downward so that the sprayed water hits the inner wall surface of the reactor pressure vessel 1 to form a liquid film on the wall surface and cool the wall surface.

When the nuclear reactor is cooled, if the temperature of the stud bolts 11 that tightly bind the flanges of the reactor pressure vessel 1 including the main body trunk flange 5a and the upper lid flange 5b together falls slowly, operation of loosening the stud bolts 11 to open the reactor pressure vessel 1 cannot be started early, because such an operation cannot be conducted until the temperature of the stud bolts 11 falls sufficiently. However, in this embodiment, the flanges 5a and 5b can be cooled at an accelerated rate by arranging spray nozzles 12 for spraying water to the insides of the flanges 5a and 5b at the head spray line 10.

Similarly, spray nozzles 13 may be arranged so as to directly spray water toward the inner wall surface of the reactor pressure vessel upper lid 2 located above the flanges 5a and 5b and cool the steam in the inside of the reactor pressure vessel upper lid 2 at an accelerated rate when the nuclear reactor is cooled. Additionally, a liquid film is formed at the insides of the flanges 5a and 5b to cool the flanges as the water sprayed to the reactor pressure vessel upper lid 2 flows down. Furthermore, spray nozzles 12 may be installed separately.

Spray nozzles 14 for spraying water to the gas phase section in the inside of the reactor pressure vessel upper lid 2 may be installed as part of the spray nozzles for discharging water from the head spray line 10 in order to absorb sensible heat of steam. Spray nozzles 13 for cooling the reactor pressure vessel upper lid 2 and spray nozzles 12 for cooling the inside parts of the flanges 5 may be installed separately.

Thus, since the reactor pressure vessel upper lid 2 of this embodiment is free from any penetrations, the heat insulating material 15 on the reactor pressure vessel and the reactor pressure vessel vent line do not interfere with each other so that the heat insulating material 15 can be taken off to open the reactor pressure vessel early while the nuclear reactor is shut down and subsequently depressurized.

Other Embodiments

The above-described embodiments are only examples and the present invention is by no means limited to them.

For instance, as for the connections of the reactor pressure vessel vent line 3 outside the reactor pressure vessel 1 of the first embodiment, it may not necessarily be connected to all of the water level gauge 7, the nitrogen gas filling line 50, the dry well sump 6 and the suppression pool, and may be connected only to some of them.

Additionally, all the nozzles of the head spray line 10 of the second embodiment including the spray nozzle 12 for cooling the insides of the flanges, the spray nozzles 13 for cooling the reactor pressure vessel upper lid and the spray nozzles 14 for cooling the gas phase section of the reactor pressure vessel upper lid may not necessarily be installed, and only some of them may be installed.

Finally, any of the variously combined arrangements of the reactor pressure vessel vent line 3 of the first embodiment and any of the variously combined arrangements of the head spray line 10 of the second embodiment may be appropriately combined and connected.

What is claimed is:

1. A boiling water reactor comprising:
    a reactor pressure vessel that includes a main body trunk having an upper open end and an openable upper lid covering the upper open end of the main body trunk from above;
    a reactor vessel vent line that penetrates lateral side of the main body trunk and has an opening section at a same level with or higher than the upper open end of the main body trunk in the reactor pressure vessel;
    a containment vessel that includes a dry well for containing the reactor pressure vessel;
    a sump arranged in the dry well and outside the reactor pressure vessel;
    a condensation tank arranged in the dry well and outside the reactor pressure vessel;
    a water level gauge arranged below the condensation tank in the dry well and outside the reactor pressure vessel;
    a nitrogen gas filling line branched from a gas phase piping;
    a water piping which extends downward from the condensation tank via the water level gauge and is connected to the main body at a position lower than the water level gauge, wherein
    the reactor vessel vent line includes a gas phase piping extending substantially horizontally penetrating the main body trunk and connected to the condensation tank, and a sump connecting piping that is connected to the sump.

2. The boiling water reactor according to claim 1, wherein the containment vessel further includes a wet well having a suppression pool and communicating with the dry well.

3. The boiling water reactor according to claim 2, wherein the reactor vessel vent line is connected to the suppression pool.

4. The boiling water reactor according to claim 1, wherein the reactor vessel vent line is connected to a head spray line for supplying spray water for cooling the upper lid from inside into the reactor pressure vessel.

5. The boiling water reactor according to claim 4, wherein the head spray line is so arranged as to directly spray water to the inner surface of the upper lid.

6. The boiling water reactor according to claim 4, wherein the main body trunk and the upper lid are coupled together at a junction that has a flange structure such that a main body trunk flange and an upper lid flange are coupled together, and
the head spray line is so arranged as to directly spray water to inner surface of the main body trunk flange and inner surface of the upper lid flange.

7. The boiling water reactor according to claim 4, wherein the head spray line is so arranged that the spray water is partly jetted out upwardly in the reactor pressure vessel.

\* \* \* \* \*